(12) United States Patent
Richardson et al.

(10) Patent No.: US 11,008,100 B1
(45) Date of Patent: May 18, 2021

(54) HELICOPTER-MOUNTED FIRE SUPPRESSION DELIVERY SYSTEM

(71) Applicants: Andre S. Richardson, Weeki Wachee, FL (US); Sandra Richardson, Weeki Wachee, FL (US)

(72) Inventors: Andre S. Richardson, Weeki Wachee, FL (US); Sandra Richardson, Weeki Wachee, FL (US)

(*) Notice: Subject to any disclaimer, the term of this patent is extended or adjusted under 35 U.S.C. 154(b) by 83 days.

(21) Appl. No.: 16/216,371

(22) Filed: Dec. 11, 2018

Related U.S. Application Data

(60) Provisional application No. 62/597,097, filed on Dec. 11, 2017.

(51) Int. Cl.
| | | |
|---|---|---|
| *A62C 3/02* | (2006.01) | |
| *A62C 99/00* | (2010.01) | |
| *B64D 1/16* | (2006.01) | |
| *A62C 33/00* | (2006.01) | |
| *B64C 27/04* | (2006.01) | |
| *B64D 7/02* | (2006.01) | |
| *B64D 47/00* | (2006.01) | |

(52) U.S. Cl.
CPC .............. *B64D 1/16* (2013.01); *A62C 3/0242* (2013.01); *A62C 33/00* (2013.01); *A62C 99/0036* (2013.01); *A62C 99/0072* (2013.01); *B64C 27/04* (2013.01); *B64D 7/02* (2013.01); *B64D 47/00* (2013.01)

(58) Field of Classification Search
CPC ... B64D 1/16; A62C 99/0036; A62C 99/0072; A62C 99/0018; A62C 3/0242; A62C 3/0228
See application file for complete search history.

(56) References Cited

U.S. PATENT DOCUMENTS

| | | | | | |
|---|---|---|---|---|---|
| 3,714,987 | A | * | 2/1973 | Mattson | B64D 1/16 169/47 |
| 3,897,829 | A | * | 8/1975 | Eason | B64D 1/16 169/53 |
| 4,090,567 | A | * | 5/1978 | Tomlinson | B64D 1/16 169/53 |
| 4,979,571 | A | * | 12/1990 | MacDonald | A62C 3/0242 169/14 |
| 5,135,055 | A | * | 8/1992 | Bisson | A62C 3/00 169/53 |
| 5,180,881 | A | * | 1/1993 | Wootton | F41G 3/06 89/41.06 |
| 5,249,501 | A | * | 10/1993 | Waldman | F41G 3/145 356/141.1 |
| 5,699,862 | A | * | 12/1997 | Rey | A62C 5/02 169/15 |
| 6,003,782 | A | * | 12/1999 | Kim | B64D 47/08 169/53 |
| 6,644,595 | B2 | * | 11/2003 | Ramage | A62C 3/0228 169/53 |

(Continued)

*Primary Examiner* — Joseph A Greenlund
(74) *Attorney, Agent, or Firm* — Cramer Patent & Design, PLLC; Aaron R. Cramer

(57) ABSTRACT

A firefighting system is delivered from a helicopter and capable of dispersing foam, water, or a chemical flame retardant at a given distance upon a conflagration. The system has a plurality of wheels secured to an underside surface which permits the system to be easily moved from beneath a helicopter to be recharged. The system is configured to operate in conjunction in low light or low visibility conditions.

16 Claims, 3 Drawing Sheets

(56) References Cited

U.S. PATENT DOCUMENTS

| | | | |
|---|---|---|---|
| 2003/0171854 A1* | 9/2003 | Pillar | G07C 5/008 |
| | | | 701/1 |
| 2004/0238186 A1* | 12/2004 | O'Dwyer | F42B 5/035 |
| | | | 169/47 |
| 2006/0175429 A1* | 8/2006 | Lanigan, Jr. | B64D 1/22 |
| | | | 239/171 |
| 2007/0103671 A1* | 5/2007 | Ash | G01S 19/51 |
| | | | 356/139.01 |
| 2008/0215700 A1* | 9/2008 | Pillar | G08G 1/20 |
| | | | 709/212 |
| 2009/0078434 A1* | 3/2009 | Archambault | A62C 31/02 |
| | | | 169/53 |
| 2009/0126952 A1* | 5/2009 | Xuan-Do | A62C 31/005 |
| | | | 169/53 |
| 2010/0178176 A1* | 7/2010 | Kenyon | B64D 1/22 |
| | | | 417/53 |
| 2010/0314139 A1* | 12/2010 | Jacobsen | A62C 5/004 |
| | | | 169/46 |
| 2011/0042108 A1* | 2/2011 | Hiebert | B01F 3/04446 |
| | | | 169/30 |
| 2013/0056230 A1* | 3/2013 | Lemke | B64D 1/16 |
| | | | 169/44 |
| 2013/0199806 A1* | 8/2013 | Zimmerman | A62C 5/022 |
| | | | 169/53 |
| 2014/0069666 A1* | 3/2014 | Vetesnik | A62C 3/0235 |
| | | | 169/53 |
| 2016/0229535 A1* | 8/2016 | Doten | A62D 1/0064 |
| 2016/0279451 A1* | 9/2016 | Doten | A62C 3/0242 |
| 2018/0043194 A1* | 2/2018 | Zimmerman | B64D 1/18 |
| 2018/0207456 A1* | 7/2018 | Katz | B05B 15/68 |
| 2019/0299040 A1* | 10/2019 | Schnarr | B01F 15/0416 |

\* cited by examiner

HELICOPTER-MOUNTED FIRE SUPPRESSION DELIVERY SYSTEM

RELATED APPLICATIONS

The present invention is a continuation of and claims the benefit of U.S. Application No. 62/597,097, filed Dec. 11, 2017, the entire disclosures of which are incorporated herein by reference.

FIELD OF THE INVENTION

The present invention relates generally to a fire suppression delivery system removably attachable to a helicopter.

BACKGROUND OF THE INVENTION

Forest fires have plagued mankind from the beginning of time. We now know that some destruction of forest areas is necessary for the proper development and stability of plant and animal species, thus man has let some fires take their natural course. However, when such forest fires are located near populated areas where rebuilding costs would be great and lives may possibly be lost, the decision to fight the fire is an easy one. Many of these fires are fought from the air in which planes or helicopters carry water from a body of water such as a lake or pond and drop it on the fire(s).

While such a practice undoubtedly assists in the extinguishing of the fire, it is far from perfect. Perhaps the biggest shortcoming is the amount of travel time necessary from the water pickup point to the fire itself. Up to an hour of travel time back and forth can be dedicated to a water drop that lasts only seconds. Accordingly, there exists a need for a means by which firefighting water can be directed from an airborne platform in a continuous manner. The development of the helicopter based firefighting system 10 fulfills this need.

SUMMARY OF THE INVENTION

The principles of the present invention provides for a helicopter-based firefighting system, comprising a helicopter which has an underside, a water cannon, a foam cannon, and a retardant cannon. The water cannon, the foam cannon, the retardant cannon are mounted on the underside to fight one or more fires. A laser targeting system and a remotely-operated shotgun are located on the underside. The laser targeting system works in conjunction with a night vision helmet worn by a pilot. The remotely-operated shotgun is operated to break one or more windows on one or more high-rise buildings when window access is needed to fight the one or more fires.

The is also a retardant chemical reservoir interconnected to a first carbon dioxide container by a first control valve. The first control valve is controlled by the targeting computer thus allowing for pressurization of the retardant cannon. A firefighting foam reservoir is interconnected to a second carbon dioxide container by a second control valve, the second control valve is also controlled by the targeting computer allowing for pressurization of the foam cannon. The retardant chemical reservoir is internal to the helicopter.

A water pump is also supported by an electric winch. The water pump is lowered from the helicopter and is located near an open bay door. The wench cable and the water pump are connected to the helicopter-based firefighting system by a flexible hose stored on a hose reel, the water pump accesses one or more large bodies of water to discharge through the water cannon to produce a water stream. The water stream is maintained for long periods of time due to an infinite source of water from the one or more large bodies of water.

The foam cannon, the retardant cannon, the laser targeting system, and the night vision helmet all interface into a targeting computer located on an interior of the helicopter. One or more other input parameters as utilized by the targeting computer are provided by one or more existing control systems already present on the helicopter and interfaced in a parallel manner through a high-speed computer interface.

The water cannon, the foam cannon, and the retardant cannon are visible on a nose of the helicopter. The water cannon, the foam cannon, and the retardant cannon are partially visible on the nose of the helicopter. The targeting computer regulates pressure of the water cannon, the foam cannon, and the retardant cannon to ensure that proper pressures are utilized for a type of the one or more fires, distance to the one or more fires, and weather conditions. The targeting computer adjusts a direction of the water cannon, the foam cannon, and the retardant cannon to ensure that the helicopter-based firefighting remain on target and task, even as the helicopter hovers and moves. The targeting computer also provides operational instruction and guidance on use of the helicopter-based firefighting system when considering other exterior factors such as low-light conditions, wind speed, weather and temperature conditions, and location/size of fire. The retardant chemical reservoir is provided with one or more quick release latches allowing for rapid interchanging of a plurality of empty reservoirs with a plurality of full reservoirs during one or more large firefighting events. The firefighting foam reservoir is provided with one or more quick release latches allowing for rapid interchanging of the empty reservoirs with the full reservoirs during one or more large firefighting events. The retardant chemical reservoir and foam reservoir is refillable for future use. The winch cable and the flexible hose allow for access up to two-thousand-five-hundred feet of separation between the water pump and the helicopter.

The helicopter-based firefighting system may be flown to the high-rise building on fire from the one or more fires. The one or more fires are decided to be fought with the water stream from the water cannon by the helicopter-based firefighting system. The laser targeting system aids in placing of the water stream upon the one or more fires. Firefighting may comprise utilizing the foam cannon is utilized without deploying the water pump. Firefighting may also comprise utilizing the retardant cannon is utilized without deploying the water pump. The one or more large bodies of water are selected from the group consisting of one or more lakes, one or more ponds, one or more swimming pools, one or more rivers, and one or more streams.

The method for utilizing a helicopter-based firefighting system may comprise the following steps: flying a helicopter to a site of one or more fires; deciding on whether to utilize a water cannon, a foam cannon, or a retardant cannon to put out the one or more fires; discharging return water in a water stream via the water cannon using targeting and tracking abilities of a targeting computer as fed inputs from a laser targeting system and continuing to utilize the water cannon, the foam cannon, or the retardant cannon to put out the one or more fires until the one or more fires are extinguished or a retardant chemical reservoir or a firefighting foam reservoir required replenishment or replacement. The method may also utilize a pilot to activate the foam cannon or the retardant cannon and target the one or more fires via use of the laser targeting system and the targeting computer with continual adjustments made by the targeting computer. Or activate the water cannon and lower the water pump on a winch cable using an electric winch into a nearby body of water.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
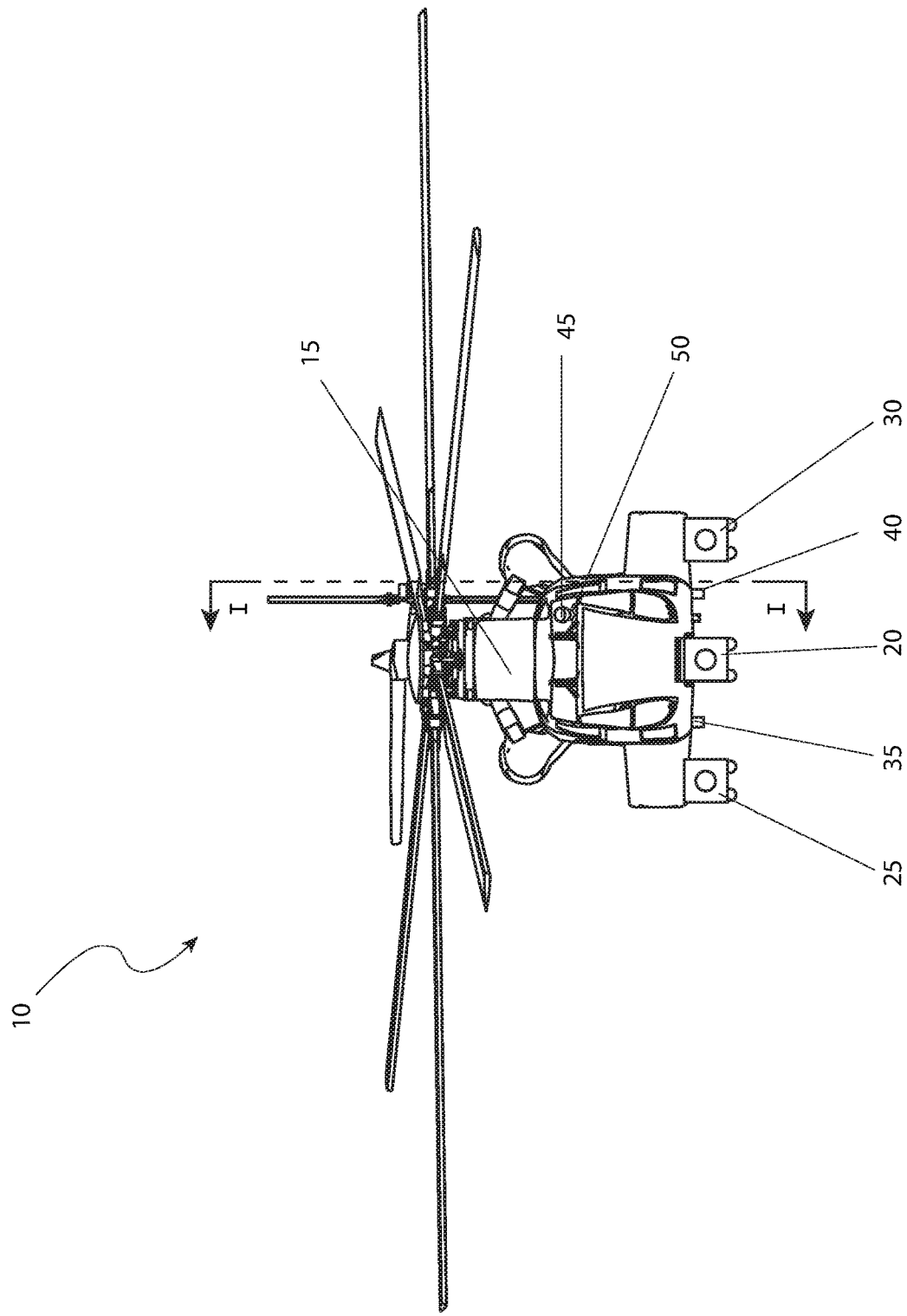
FIG. 1 is a front view of the helicopter-based firefighting system 10, according to the preferred embodiment of the present invention.

DESCRIPTIVE KEY 10 helicopter-based firefighting system
15 helicopter
20 water cannon
25 foam cannon
30 retardant cannon
35 laser targeting system
40 shotgun
45 night vision helmet
50 pilot
55 targeting computer
60 retardant chemical reservoir
65 first carbon dioxide (CO2) container
70 first control valve
75 firefighting foam reservoir
80 second carbon dioxide (CO2) container
85 second control valve
90 quick release latch
95 water pump
100 electric winch
105 open bay door
110 winch cable
115 flexible hose
120 hose reel
125 fire
130 high-rise building
135 body of water
140 window
145 water stream

1. DESCRIPTION OF THE INVENTION

Figure 2:
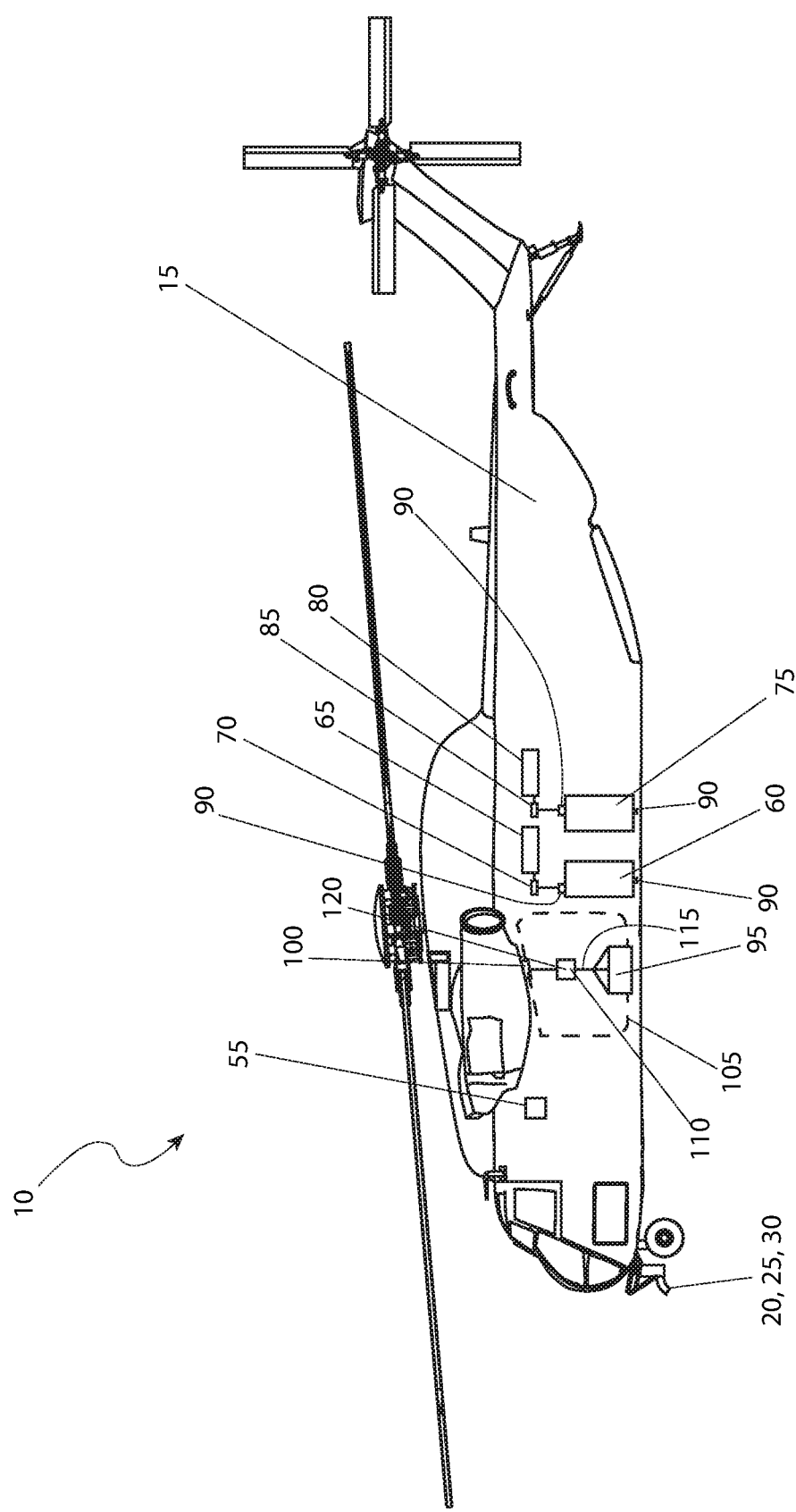
FIG. 2 is a sectional view of the helicopter-based firefighting system 10, as seen along a line I-I, as shown in FIG. 1, according to the preferred embodiment of the present invention; and, FIG. 3 is a perspective view of the helicopter-based firefighting system 10 shown in a utilized state, according to the preferred embodiment of the present invention.
Figure 3:
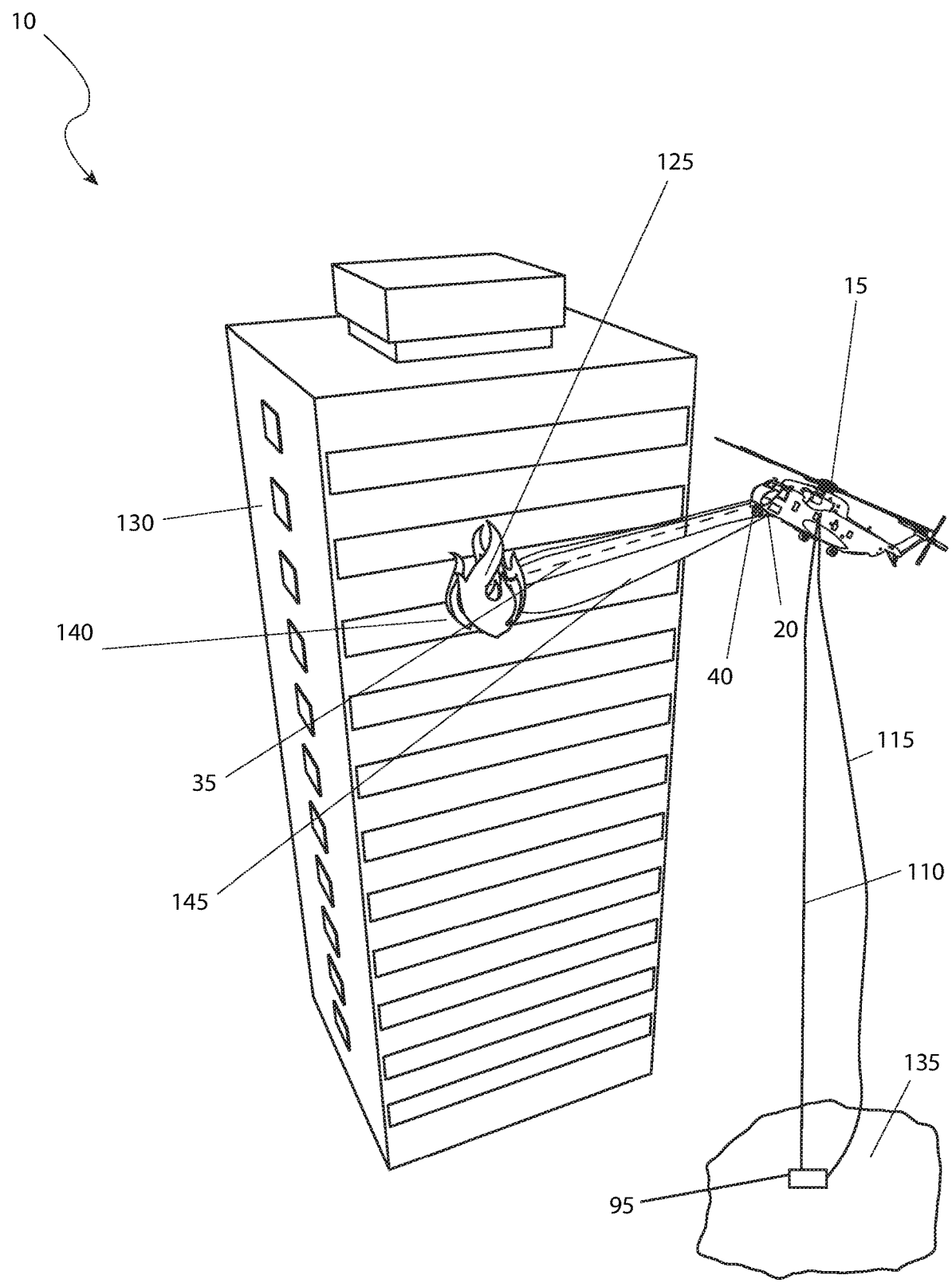

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. DETAILED DESCRIPTION OF THE FIGURES

Referring now to FIG. 1, a front view of the helicopter-based firefighting system 10, according to the preferred embodiment of the present invention is disclosed. The helicopter-based firefighting system 10 (herein also described as the "system") 10, is provided upon a helicopter 15 platform. The helicopter 15 as depicted is a Sikorsky MH-53 for purposes of illustration due to its payload carrying capacity and power. However, other makes and models of helicopter 15 may be utilized with the system 10, provided they are suitable. Thus, the type of helicopter 15 used with the system 10 is not intended to be a limiting factor of the present invention.

The helicopter 15 is provided with a water cannon 20, a foam cannon 25, and a retardant cannon 30, each mounted on its underside, and are used to fight fires. Additionally, a laser targeting system 35 and a remotely-operated shotgun 40 are located on the underside of the helicopter 15 as well. The laser targeting system 35 works in conjunction with a night vision helmet 45 worn by the pilot 50. The shotgun 40 is operated to break windows on high-rise buildings 130 when window 140 access is needed to fight fires 125. Further description of the shotgun 40 will be provided herein below.

The foam cannon 25, the retardant cannon 30, the laser targeting system 35, the shotgun 40, and the night vision helmet 45 all interface into a targeting computer 55 located on the interior of the helicopter 15. The targeting computer 55 provides operational instruction and guidance on the optimum use of the system 10 when considering other exterior factors such as low-light conditions, wind speed, weather and temperature conditions, location/size of fire, and the like. Other input parameters as utilized by the targeting computer 55 would be provided by existing control systems already present on the helicopter 15 and interfaced in a parallel manner through a high-speed computer interface. In addition, the targeting computer 55 would regulate pressure of the water cannon 20, foam cannon 25, and the retardant cannon 30 to ensure that proper pressures are utilized for the type of fire 125, distance to fire 125, weather conditions and the like. The targeting computer 55 would automatically adjust the direction of the water cannon 20, the foam cannon 25, and the retardant cannon 30 to ensure that the firefighting capabilities of the system 10 remain on target and task, even as the helicopter 15 hovers and moves.

Referring next to FIG. 2, a sectional view of the system 10, as seen along a line I-I, as shown in FIG. 1, according to the preferred embodiment of the present invention is depicted. This figure clarifies many of the components of the system 10 that are internal to the helicopter 15. A retardant chemical reservoir 60 is interconnected to a first carbon dioxide (CO2) container 65 by a first control valve 70. The first control valve 70 is controlled by the targeting computer 55 thus allowing for pressurization of the retardant cannon 30. Likewise, a firefighting foam reservoir 75 is interconnected to a second carbon dioxide (CO2) container 80 by a second control valve 85. The second control valve 85 is also controlled by the targeting computer 55 thus allowing for pressurization of the foam cannon 25. Both the retardant chemical reservoir 60 and the firefighting foam reservoir 75 are provided with quick release latches 90 allowing for rapid interchanging of empty reservoirs with full reservoirs during large firefighting events such as forest fires or the like. The empty retardant chemical reservoir 60 and the empty firefighting foam reservoir 75 can be refilled for future use.

A water pump 95 supported by an electric winch 100 can be lowered from the helicopter 15 and is located near an open bay door 105. In addition to the winch cable 110, the water pump 95 is connected to the system 10 by a flexible hose 115 stored on a hose reel 120. The water pump 95 is used to access large bodies of water 135 such as lakes, ponds, swimming pools, rivers, streams, or the like and provide water for use by the system 10 to discharge through the water cannon 20 to produce a water stream 145. Such a water stream 145 can be maintained for long periods of time due to the infinite (or virtually infinite) source of water. It is envisioned that the overall length of the winch cable 110 and the flexible hose 115 would allow for access up to two-thousand-five-hundred feet (2500 ft.), or approximately one-half mile (½ mi.) of separation between the water pump 95 and the helicopter 15. Note that the water cannon 20, the foam cannon 25, and the retardant cannon 30 are visible (or partially visible) on the nose of the helicopter 15.

Referring to FIG. 3, a perspective view of the system 10 shown in a utilized state, according to the preferred embodiment of the present invention is shown. The usage is on a fire 125 in a high-rise building 130 which cannot be typically fought externally by conventional firefighting equipment. The helicopter 15 is flown to the vicinity of the high-rise building 130 in a conventional manner. Should the decision be made to fight the fire 125 with a water stream 145 from the water cannon 20, the pilot 50 will lower the water pump 95 to a nearby body of water 135 on the winch cable 110. Water is then pumped to the system 10 via the flexible hose 115 whereupon it is discharged from the water cannon 20 in the water stream 145. Should a window 140 need to be broken, the shotgun 40 is utilized with the aid of the laser targeting system 35. The laser targeting system 35 also aids in the placement of the water stream 145 upon the fire 125. Firefighting utilizing the foam cannon 25 (as shown in FIG. 1) or the retardant cannon 30 (as shown in FIG. 1) may also be utilized without the need to deploy the water pump 95.

3. OPERATION OF THE PREFERRED EMBODIMENT

The preferred embodiment of the present invention can be utilized by the common user in a simple and effortless manner with little or no training. It is envisioned that the system 10 would be constructed in general accordance with FIG. 1 through FIG. 3. The user would procure the system 10 either with a new helicopter 15 or as an add-on aftermarket kit for an existing helicopter 15.

After procurement and prior to utilization, the system 10 would be prepared in the following manner: an initial charge would be placed in the retardant chemical reservoir 60, the firefighting foam reservoir 75, the first carbon dioxide (CO2) container, and the second carbon dioxide (CO2) container 80.

During utilization of the system 10, the following procedure would be initiated: the helicopter 15 would be flown to the site of the fire 125 such as in a high-rise building 130 or as part of a forest fire 125; a decision on whether to use the water cannon 20, the foam cannon 25 and/or the retardant cannon 30 would be made; in the case of the foam cannon 25 or retardant cannon 30, the pilot 50 would activate such systems and target the fire 125 via use of the laser targeting system 35 and targeting computer 55 with continual adjustments made by the targeting computer 55; should the water cannon 20 be used, the pilot 50 would lower the water pump 95 on the winch cable 110 using the electric winch 100 into a nearby body of water 135; returned water would be discharged in the form of a water stream 145 via the water cannon 20 using the targeting and tracking abilities of the targeting computer 55 as fed inputs from the laser targeting system 35. These efforts would continue until the fire 125 was extinguished or the retardant chemical reservoir 60 or firefighting foam reservoir 75 required replenishment/replacement.

After use of the system 10, the helicopter 15 is returned to its base of operations whereupon the retardant chemical reservoir 60 and/or firefighting foam reservoir 75 is replenished or replaced. This activity places the system 10 in a ready state for continued use on future fire 125 in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A helicopter-based firefighting system, comprising:
   a helicopter having an underside, a water cannon, a foam cannon, and a retardant cannon, said water cannon, said foam cannon, said retardant cannon are mounted on said underside to fight one or more fires;
   a laser targeting system and a remotely-operated shotgun located on said underside, said laser targeting system is adapted to work in conjunction with a night vision helmet worn by a pilot, said remotely-operated shotgun is operated to break one or more windows on one or more high-rise buildings when window access is needed to fight said one or more fires;
   a retardant chemical reservoir interconnected to a first carbon dioxide container by a first control valve, said first control valve is controlled by a targeting computer thus allowing for pressurization of said retardant cannon, a firefighting foam reservoir is interconnected to a second carbon dioxide container by a second control valve, said second control valve is also controlled by said targeting computer allowing for pressurization of said foam cannon, said retardant chemical reservoir is internal to said helicopter;
   a water pump supported by an electric winch, said water pump is lowered from said helicopter and is located adjacent to an open bay door, said winch cable and said water pump are connected to said helicopter-based firefighting system by a flexible hose stored on a hose reel, said water pump accesses one or more bodies of water to discharge through said water cannon to produce a water stream, said water stream is maintained for long periods of time due to a source of water from said one or more bodies of water; and wherein said foam cannon, said retardant cannon, said laser targeting system, and said night vision helmet all interface into a targeting computer located on an interior of said helicopter, one or more other input parameters as utilized by said targeting computer are provided by one or more existing control systems already present on said helicopter; and wherein said retardant chemical reservoir is provided with one or more quick release latches allowing for interchanging of a plurality of empty reservoirs with a plurality of full reservoirs during one or more firefighting events.

2. The helicopter-based firefighting system according to claim 1, wherein said water cannon, said foam cannon, and said retardant cannon are visible on a nose of said helicopter.

3. The helicopter-based firefighting system according to claim 2, wherein said water cannon, said foam cannon, and said retardant cannon are partially visible on said nose of said helicopter.

4. The helicopter-based firefighting system according to claim 1, wherein said targeting computer regulates pressure of said water cannon, said foam cannon, and said retardant cannon to ensure that pressures are utilized for a type of said one or more fires, distance to said one or more fires, and weather conditions.

5. The helicopter-based firefighting system according to claim 1, wherein said targeting computer adjusts a direction of said water cannon, said foam cannon, and said retardant cannon to ensure that said helicopter-based firefighting remain on target and task, even as said helicopter hovers and moves.

6. The helicopter-based firefighting system according to claim 1, wherein said targeting computer provides operational instruction and guidance on use of said helicopter-based firefighting system when considering other exterior factors such as low-light conditions, wind speed, weather and temperature conditions, and location/size of fire.

7. The helicopter-based firefighting system according to claim 1, wherein said firefighting foam reservoir is provided with one or more quick release latches allowing for interchanging of said empty reservoirs with said full reservoirs during one or more firefighting events.

8. The helicopter-based firefighting system according to claim 1, wherein said retardant chemical reservoir is refillable for future use.

9. The helicopter-based firefighting system according to claim 1, wherein said firefighting foam reservoir is refillable for future use.

10. The helicopter-based firefighting system according to claim 1, wherein said winch cable and said flexible hose allow for access up to two-thousand-five-hundred feet of separation between said water pump and said helicopter.

11. The helicopter-based firefighting system according to claim 1, wherein said helicopter based firefighting system is flown to said high-rise building on fire from said one or more fires.

12. The helicopter-based firefighting system according to claim 1, wherein said one or more fires are decided to be fought with said water stream from said water cannon by said helicopter based firefighting system.

13. The helicopter-based firefighting system according to claim 1, wherein said laser targeting system aids in placing of said water stream upon said one or more fires.

14. The helicopter-based firefighting system according to claim 1, wherein firefighting utilizing said foam cannon is utilized without deploying said water pump.

15. The helicopter-based firefighting system according to claim 1, wherein firefighting utilizing said retardant cannon is utilized without deploying said water pump.

16. The helicopter-based firefighting system according to claim 1, wherein said one or more bodies of water are selected from the group consisting of one or more lakes, one or more ponds, one or more swimming pools, one or more rivers, and one or more streams.

* * * * *